(12) United States Patent
Williams

(10) Patent No.: US 9,705,389 B2
(45) Date of Patent: Jul. 11, 2017

(54) POWER GENERATION SYSTEM AND METHOD

(71) Applicant: Donald Williams, The Woodlands, TX (US)

(72) Inventor: Donald Williams, The Woodlands, TX (US)

( * ) Notice: Subject to any disclaimer, the term of this patent is extended or adjusted under 35 U.S.C. 154(b) by 0 days.

(21) Appl. No.: 15/271,074

(22) Filed: Sep. 20, 2016

(65) Prior Publication Data

US 2017/0104400 A1    Apr. 13, 2017

Related U.S. Application Data

(63) Continuation of application No. 14/314,771, filed on Jun. 25, 2014, now Pat. No. 9,470,442.

(60) Provisional application No. 61/838,932, filed on Jun. 25, 2013.

(51) Int. Cl.
| | |
|---|---|
| *H02K 23/52* | (2006.01) |
| *F02G 5/02* | (2006.01) |
| *H02K 7/14* | (2006.01) |
| *H02K 7/18* | (2006.01) |
| *H02K 11/04* | (2016.01) |
| *F25B 31/02* | (2006.01) |

(52) U.S. Cl.
CPC ............. *H02K 23/52* (2013.01); *F02G 5/02* (2013.01); *F25B 31/02* (2013.01); *H02K 7/14* (2013.01); *H02K 7/1815* (2013.01); *H02K 11/046* (2013.01); *F25B 2327/001* (2013.01)

(58) Field of Classification Search
CPC .. F25B 29/003; F25B 27/00; F25B 2327/001; F25B 31/02; H02K 23/52; H02K 7/1807; H02K 7/1815; H02K 11/046
See application file for complete search history.

(56) References Cited

U.S. PATENT DOCUMENTS

| | | | | |
|---|---|---|---|---|
| 3,941,012 | A * | 3/1976 | Mayer ................. | B60H 1/3222 192/103 B |
| 4,991,400 | A * | 2/1991 | Wilkinson .............. | F25B 27/00 62/228.4 |
| 5,391,925 | A * | 2/1995 | Casten ...................... | F02C 6/00 290/1 R |
| 5,532,525 | A * | 7/1996 | Kaiser ...................... | H02J 4/00 307/18 |
| 5,880,536 | A * | 3/1999 | Mardirossian ........... | H02J 3/32 307/38 |

(Continued)

*Primary Examiner* — Daniel Rohrhoff
(74) *Attorney, Agent, or Firm* — Alberto Q. Amatong, Jr.; Amatong McCoy LLC

(57) ABSTRACT

A method is disclosed for generating and distributing electric power for localized use. The method entails providing an enclosed building having an air conditioning and ventilation unit for supplying cooled air within the building, the unit including a closed loop circuit configured to operate a closed loop refrigeration cycle, including a compressor operable to compress a working fluid of the closed loop circuit. The method further includes engaging an internal combustion engine with the compressor and operating the internal combustion engine to drive the compressor, thereby transferring energy to the refrigeration cycle. The method may also involve engaging an electric motor with the compressor and operating the electric motor to drive the compressor, thereby transferring energy to the refrigeration cycle.

5 Claims, 10 Drawing Sheets

(56) References Cited

U.S. PATENT DOCUMENTS

| | | | | |
|---|---|---|---|---|
| 5,918,805 A * | 7/1999 | Guyer | F01K 17/02 237/2 A | |
| 6,053,418 A * | 4/2000 | Guyer | F01K 17/02 237/12.1 | |
| 6,067,482 A * | 5/2000 | Shapiro | F25B 49/02 307/64 | |
| 6,084,318 A * | 7/2000 | Mardirossian | H02J 3/32 307/38 | |
| 6,234,400 B1 * | 5/2001 | Guyer | F01K 17/02 237/12.1 | |
| 6,757,591 B2 * | 6/2004 | Kramer | H02J 3/00 700/288 | |
| 6,813,897 B1 * | 11/2004 | Bash | F25B 27/00 307/64 | |
| 6,823,690 B2 * | 11/2004 | Runk | B60H 1/322 62/133 | |
| 7,040,544 B2 * | 5/2006 | Guyer | F24D 5/02 237/12.1 | |
| 7,274,975 B2 * | 9/2007 | Miller | G06Q 50/06 700/295 | |
| 7,284,709 B2 * | 10/2007 | Guyer | F24D 5/02 237/12.1 | |
| 8,099,198 B2 * | 1/2012 | Gurin | B60K 6/28 180/65.21 | |
| 8,295,950 B1 * | 10/2012 | Wordsworth | B60H 1/00428 307/86 | |
| 8,491,274 B2 * | 7/2013 | Taylor | F04C 29/0064 192/48.2 | |
| 8,593,002 B2 * | 11/2013 | Hamm | B65D 47/02 290/1 A | |
| 9,470,442 B2 * | 10/2016 | Williams | F01N 5/02 | |
| 2007/0112694 A1 * | 5/2007 | Metcalfe | G06Q 10/06 705/412 | |
| 2009/0012651 A1 * | 1/2009 | Lifson | F24F 11/0009 700/276 | |
| 2009/0178421 A1 * | 7/2009 | Yeh | F25B 49/025 62/132 | |
| 2009/0178423 A1 * | 7/2009 | Yeh | F24F 11/0086 62/236 | |
| 2009/0228149 A1 * | 9/2009 | Alston | F04B 35/00 700/276 | |
| 2009/0228150 A1 * | 9/2009 | Alston | F25B 27/00 700/276 | |
| 2011/0154841 A1 * | 6/2011 | Hsiao | F25B 27/00 62/238.7 | |
| 2012/0191253 A1 * | 7/2012 | Rockenfeller | F24F 3/00 700/276 | |

* cited by examiner

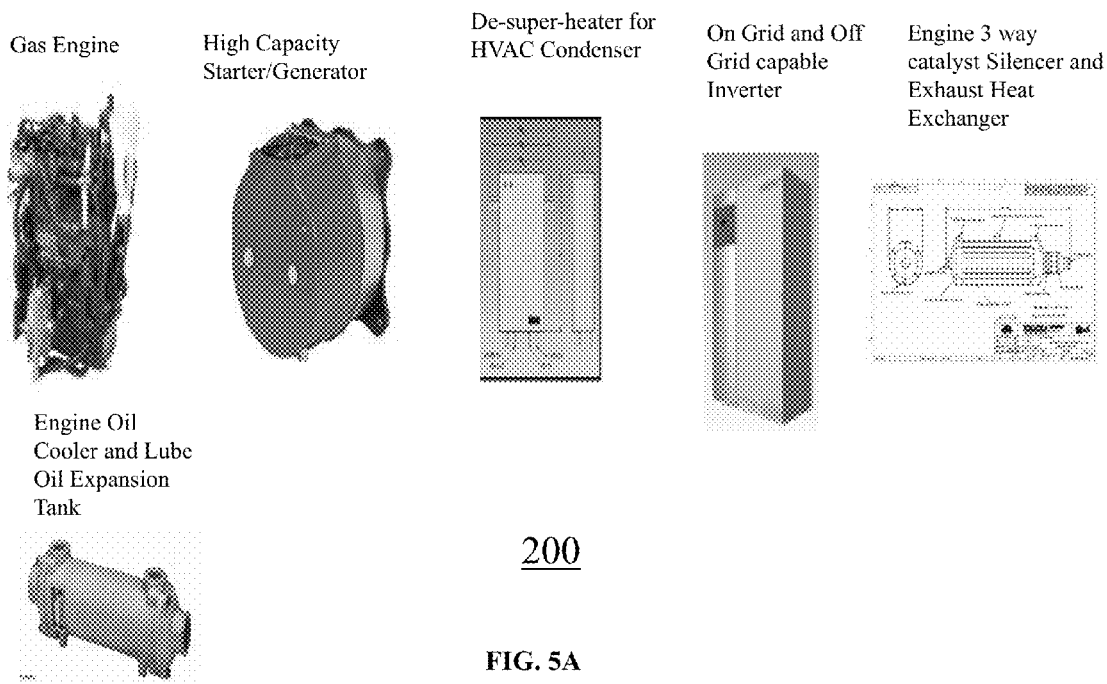

Gas Engine | High Capacity Starter/Generator | De-super-heater for HVAC Condenser | On Grid and Off Grid capable Inverter | Engine 3 way catalyst Silencer and Exhaust Heat Exchanger Engine Oil Cooler and Lube Oil Expansion Tank

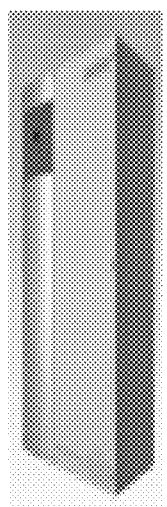

Proven Inverter Technology

Xantrex On Grid and Off Grid capable Inverters are time tested technology in the Renewable Energy Industry

- True sine wave, 120/240-volt AC, split-phase, inverter/charger
- DC to AC inverter
- Battery charger, and an AC auto-transfer switch.
- Operates with generators and renewable energy sources to provide full-time or backup power.

FIG. 5B

POWER GENERATION SYSTEM AND METHOD

The present application is a Continuation application of U.S. patent application Ser. No. 14/314,771, filed on Jun. 25, 2015 (now allowed), which claims the benefit of U.S. Provisional Application Ser. No. 61/838,932, filed on Jun. 25, 2013 (now expired), which disclosure is hereby incorporated by reference for all purposes and made a part of the present disclosure.

BACKGROUND

The present disclosure relates generally to power generation and/or distribution, particularly for localized consumption. The disclosure relates to both a system and a method of, or for, power generation and/or distribution. The disclosure also relates to a system and method for meeting the energy demand of a localized environment.

The conventional system of centralized power generation and distribution over a wide geographic network is characterized by vast losses of energy either through thermal loss during production or distribution loss during delivery. It is estimated that only forty percent of the energy generated by such centralized plants in the United States actually make it to the consumer. This grossly inefficient model may be countered somewhat by electric power generating plants that generate power more closely to the consumer and utilizing the thermal energy that is generated as byproduct in electric power generation. In this regard, micro combined heat and power generation systems are available that co generate electricity and heat and utilize the heat on location.

Conventional electric driven air-conditioning systems typically utilize large compressors that are driven by AC inductive motors. These motors demand power for start up and for continuous operation. Reliance on the systems on hot summer days contributes to very high energy demand peaks on the electric grid and inefficiency on our general collective consumption of energy. Internal combustion engines (ICE) can be utilized to drive HVAC compressors directly and the thermal heat generated by the ICE can be used to heat water for domestic use, dehumidify the conditioned air using desiccants, to distill or purify water or to heat swimming pools or Jacuzzis, or in the case of businesses that use boilers, to preheat water for process heat or to generate steam. Small systems that are capable of generating up to 5 KW of electric power and heat simultaneously and at the same time, provide air conditioning are called Micro Combined Cooling Heating and Power (MCCHP) Systems.

Another application in which cogeneration is found is in Auxiliary Power Units (APU) for commercial long haul trucks. In the United States, these trucks are required by law to rest for ten hours after eleven hours of driving. APUs are designed to eliminate long idle rest stops. Similar to the MCCHP, the APU uses a small internal combustion engine (ICE), typically fueled by diesel, in lieu of the truck's main engine. Since this engine is much smaller than the main engine in terms of displacement, it uses a fraction of the fuel which would be otherwise required to idle the larger engine. These units can run for as much as eight hours on one US gallon of diesel. The engine provides heat to the main engine so that the main engine can be started easily. An APU can save up to 20 gallons of fuel a day, and can extend the useful life of a truck's main engine by around 100,000 miles, avoiding long idle times. APUs provide the truck cab with electrical power for hotel load requirements and may also include air-conditioning for the truck cab. Some APUs even provide an air compressor that maintains the trucks required supply of high pressure air for suspension, brakes and other requirements.

SUMMARY

A method is described for generating and distributing electric power for localized use. The method includes providing a substantially enclosed building having an air conditioning and ventilation unit for supplying cooled air within the building. The unit includes a closed loop circuit configured to operate a closed loop refrigeration cycle, including a compressor operable to compress a working fluid of the closed loop circuit. The method entails engaging an internal combustion engine with the compressor, and operating the internal combustion engine to drive the compressor, thereby transferring energy to the refrigeration cycle (and thus, to the localized environment). The method further includes engaging an electric motor with the compressor; and operating the electric motor to drive the compressor, thereby transferring energy to the refrigeration cycle.

In one aspect, a method of generating and distributing electric power is provided to meet localized demand. The method entails providing a local environment having an air conditioning unit for supplying cooled air within the local environment. The unit includes a circuit configured to operate a refrigeration cycle, including a compressor operable to compress a working fluid of the circuit. The method further entails engaging an internal combustion engine with the compressor, and operating the internal combustion engine to drive the compressor, thereby transferring energy to the refrigeration cycle.

In another aspect, a method is provided for generating and distributing electric power for localized use. An air conditioning unit for supplying cooled air is initiated to operate a closed loop refrigeration cycle, whereby a compressor operates to compress a working fluid. Then, an internal combustion engine is engaged with the compressor and the internal combustion engine is operated to drive the compressor, thereby transferring energy to the refrigeration cycle. An electric motor generator unit is then engaged with the compressor and operated to drive the compressor, thereby transferring energy to the refrigeration cycle.

Furthermore, a system is provided for generating electric power in a localized installation. The system includes a hybrid power generator, an air conditioning cooling system, including a compressor, and a selectively engageable drive assembly operably connected with the power generator. The power generator is engageable with the compressor to compress a working refrigerant fluid, and the hybrid power generator includes an internal combustion engine and an electric motor. Also, the drive assembly is operable to selectively engage the electric motor and the internal combustion engine with the compressor.

BRIEF DESCRIPTION OF THE DRAWINGS

FIGS. 5A-5E depict an exemplary market presentation including slides illustrating exemplary illustrations and exemplary components.

DETAIL DESCRIPTION

The present disclosure relates generally to a system and method for power generation and distribution, particularly for localized utilization or consumption. To illustrate aspects of the system and method, certain embodiments or applications described. Description of these embodiments or applications may be limited to localized environment largely defined by a residence or commercial building. It will become apparent to one skilled in the relevant engineering, architecture, or other technical art, that these aspects in part, or in their entirety, may be equally applicable to other settings and other applications.

In further exemplary applications, a system and method according to the disclosure provides a modular electric and internal combustion engine driven HVAC systems suitable for incorporation with an Auxiliary Power Unit (APU), such as that commonly used for idle reduction in class 8 freight trucks. In another exemplary application, such a system and method may be suitable for use in or with a combined cooling, heating, and power system, such as that employed in stationary applications for residential housing or commercial office buildings. Such a system for localized use is often referred to as a Micro Combined Cooling, Heating and Power System or MCCHP system.

Figure 1A:
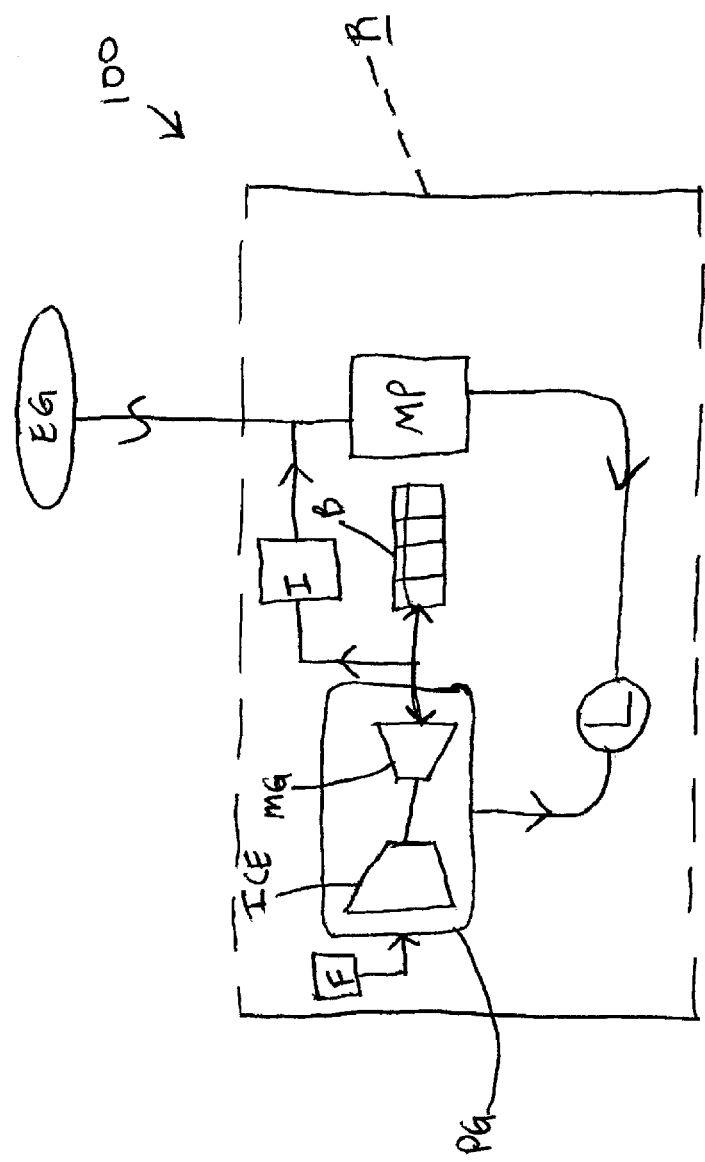
FIG. 1A is a simplified schematic of the basic components of a power generation and distribution system according to the present disclosure.

FIG. 1 depicts an exemplary system installation 100 for generating and distributing power in a localized environment. The depicted system contains some of the basic components of the system. In this example, the localized environment is provided by a permanent residence (R) (or commercial office building) that is also connected to, and supplied by, the electrical grid (EG). As is typical with such environments, and well suited for the system installation of the disclosure, the residence (R) is characterized by one or more energy demand loads (L), including, for example, air condition cooling demand, electricity demand for ordinary lighting and appliances. In further applications and installations, the localized environment may also exhibit heating demands (as also described herein), for example, for space heating or preheating of hot water systems. It should be noted that when referring to the localized environment, e.g., a residence or a building, in describing the system, installation, or method of operation, components of the localized environment may include equipment, units, or systems not necessarily physically located within the physical boundaries or enclosure of the residence, building, or vehicle (or other localized enclosure or environment). Such auxiliary components or systems may be physically located, partially or entirely, apart from the residence, building, vehicle, and the like, but operably associated therewith and serving the demands of the localized environment.

To satisfy the requirements of the energy demand loads (L), the residence (R) may draw power from the electrical grid (EG). As known in the art, power is supplied from a low voltage transformer to the AC load panel (MP) of the residence (R), which may include a main panel and distribution panel connecting to the various loads in the physical residence. The exemplary system further includes a power generator (PG) that is operable to meet some or all the demand load (L) of the residence (R), temporarily or permanently in lieu of the electrical grid (EG). In one aspect of the disclosure, the power generator (PG) is a hybrid power generator that includes an internal combustion engine (ICE) as a prime mover and a motor generator (MG), both of which may be engaged to output power (i.e., rotating mechanical energy) for use by the residence (R). In preferred installations, such a hybrid power generator (PG) is selectively operational in at least a first mechanical drive mode in which the fuel consuming prime mover (ICE) is engaged and a second mechanical drive mode in which the DC motor generator (MG) is engaged. Such selective drive capability may be embodied in a drive assembly (DA) that is engageable with each of the engine (ICE), motor generator unit (MG) and the load (L).

In this installation, a fuel supply (F) such as natural gas, diesel, or propane may be supplied to the installation 100 for consumption by the power generator (PG). In a further aspect, the power generator (PG) may also be operable in a drive mode in which the internal combustion engine (ICE) also drives the motor generator to generate DC power. This DC output may be directed for storage by a battery bank (B) or to an inverter (I) for conversion to AC power. The AC power may, in turn, be directed to the main panel (MP) for use in the residence or in particular applications, to the electrical grid (EG) for distribution.

Thus, in one respect, the system installation 100 provides for a localized environment access to an energy source independent from the electrical grid. This energy source originates from fuel supplied to an internal combustion. Chemical energy is converted to mechanical energy that is then utilized in meeting a load requirement of the localized environment. Alternatively, the mechanical energy may be used to generate DC power to satisfy immediate loads demands of the localized environment, or to store in the battery bank. In the latter case, the energy stored may be used later to drive the engine (and generate energy for meeting the demand load).

In further installations, heat energy generated by operation of the power generator (PG) (i.e., from chemical reactions or mechanical processes within the engine) may also be transferred to the residence (R) to satisfy, at least partly, the energy demands of another load (L). For example, heat exhausted by the engine may be used to heat or preheat water in the HVAC system, pool water, or a water heater, or heat air used for space heating.

Figure 1B:
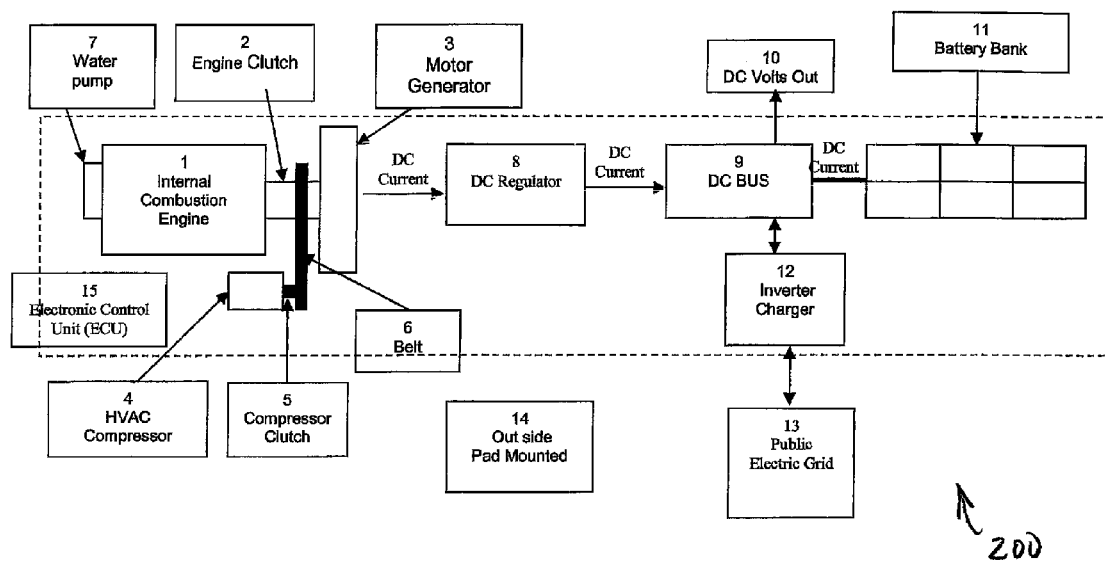
FIG. 1B is a simplified schematic of an exemplary power generation and distribution system installation according to one embodiment of the present disclosure.

Referring now to FIG. 1B, an exemplary system installation 200 for a localized environment is shown servicing a house or residential unit (R). The system 200 preferably integrates a hybrid power generator with the energy demand loads of the residence, which may include a heating, ventilation, and air conditioning system (HVAC) as commonly utilized in these installation. The HVAC system features a compressor 4 compressing a refrigerant or working fluid. The installation also includes a low voltage household circuit for supplying electricity to household appliances and equipment, outlets, and lighting. The household circuit includes a main panel to which utility power from the electrical grid 13 is supplied, as generally known in the industry. In operational mode, the power generator drives the compressor 4 to increase refrigerant vapor pressure. For example, in the case of a common centrifugal compressor, the power generator drives the main shaft (and impeller) of the compressor.

In yet another aspect of the disclosure, the hybrid power generator employs two power sources each of which may be selectively engaged with the compressor 4. In this example, the power sources are an internal combustion engine 1 and a motor generator 3. The internal combustion engine 1 is preferably pad mounted and situated adjacent the outside of the house. The engine may be one of various designs that are commercially available. In certain preferred embodiments, the engine 1 is a natural gas or propane engine. One suitable internal combustion engine is natural gas engine from Kubota (Kubuta DG972) which is rated at 25 (power output). The power generator is preferably equipped with a drive assembly including an engine clutch 2 and belt drive 6 that operably engages the engine 1 with the compressor 4, when a compressor clutch 5 is engaged. The drive assembly, specifically engine clutch 2, can also engage engine 1 directly with the motor generator unit 3.

In this preferred installation, the motor generator is a DC high capacity started/generator such as ECycle. The motor generator 3 is connected with a DC regulator 8 and thus, a DC power supply. As shown in FIG. 1B, the installation further includes a DC bus 9 that serves both an inverter charger 12 and a battery bank 11, as well as providing an auxiliary DC power outlet 10 for other residential usage. The inverter charger 12 connects with the electrical power supply (i.e., electrical power grid 13) to deliver excess AC power to the grid or bring AC power to the DC bus for distribution. In further applications, renewable electricity generators (e.g., solar panels or wind turbines) may be integrated with the installation to deliver additional energy supply. In such cases, the inverter 12 may be utilized for receiving and converting the additional electricity source.

In a further exemplary system, an electrical control unit or ECU 15 is incorporated as the controller of the system and provides the logic (hardware and software) for activating the engine clutch 2 between the internal combustion engine 1 and the motor generator 3. With proper mutual engagement of the motor generator 3 and engine 1 via engine clutch 2, the ECU 15 initiates rotation of the motor generator 3 to start the internal combustion engine 1. The engine 1 will, according to the settings of its governor, which is also programmed within ECU 15, allow the engine 1 to throttle to a set rpm. At this operational setting, the engine 1 overcomes the motor generator 3. In this mode, the motor generator 3 generates and delivers DC power to the DC regulator 8 and preferably, to the battery bank 11 for charging.

As dictated by the demands of the installation, the ECU 15 activates compressor clutch 5 to engage the AC Compressor 4. The hybrid power generator then drives the compressor 4, thereby transferring energy to the HVAC system of the residence. In normal operation, the engine 1 will drive the compressor 4 to compress the working fluid of the HVAC system as required by the appropriate closed loop refrigerant cycle. As determined by the ECU 15 (and as programmed by the user), the engine clutch 2 may simply be disengaged from the motor generator 3. Power provided from battery bank 11 may then be used to run motor generator 3 and thereby, drive the compressor 4. In certain applications, the choice of drive will be done automatically via the electronic control module (to optimize efficiency) or manually (by the operator to comply with noise and emissions regulatory issues). Factors or criteria determining which drive mode to employ include the availability of electrical power from the battery bank or the grid, fuel supply status for the engine for the engine, as well as the demand load presented by the residence. In any event, the ECU 15 may be programmed or configured to receive and/or process input representative of these factors, and determine the various drive modes of the power generator.

While motor generator 3 is engaged and operating as a DC generator, its voltage is regulated to 14, 48 or 56 volts and sent to a DC Bus 9 which in turn, provide powers for DC loads within the installation. Alternatively, it can provide DC power to inverter 12 and provide AC loads to the application or to the electric grid (for a fee or subsidy used by the local utility. A small battery bank 11 preferably stores power and makes power available to start the motor generator 3. Further, the battery bank 11 may be utilized to provide a supplemental power needed to accommodate for DC or AC load spikes.

In preferred applications, the load from the generator is provided as a DC load so as to allow other DC loads from renewable power sources to feed in to the DC bus and share a common Inverter. ECU 15 may be connected with inverter charger 12 to monitor AC current load demand so that it may start the generator 3 in the event that the load so requires. Furthermore, the inverter charger 12 may provide an additional source of DC power to the DC bus, which may then be used to charge the battery bank 11.

Figure 2:
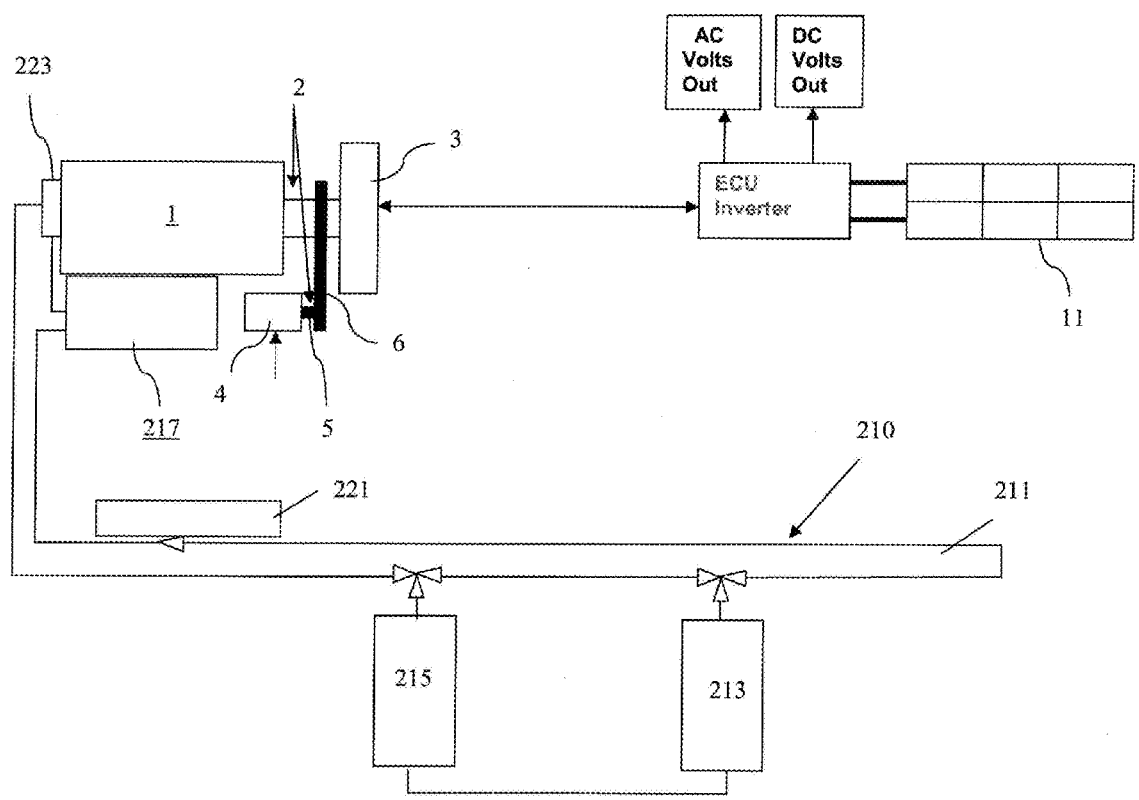
FIG. 2 is a simplified schematic of a power generation and distribution system installation according to an alternate embodiment.

With reference now to FIG. 2, a further and alternative installation according to the disclosure incorporates a closed loop heating circulation system 210. The installation utilizes heat generated in the operation of the engine 1 for satisfying, at least partially, further energy demands of the residence. In the specific installation illustrated, heat generated by the engine 1 is used to preheat or heat furnace water or hot water systems. An exhaust heat exchanger 217 installed and positioned in fluid communication with the exhaust side of the engine's circulation cooling system (as schematically represented in FIG. 2) is preferably employed to transfer heat generated by the engine. In this embodiment depicted by FIG. 2, a water circulation line 211 is connected with a process dehumidification unit 215 and/or furnace or hot water heater 213. Thus, in a further example, the circulation line 211 passes cool water through coils of the heat exchanger 217, whereby heat is transferred from the engine's circulation to the cooler residential circulation water line. The heat is then passed to the demand for such use as pre-heating the furnace water or water for the water heater 213. To facilitate flow and heat transfer, the circuit 210 also employs a water circulation pump 221 and an engine jacket water expansion tank, as generally known in the art.

In the case of an APU application, the hybrid power generator may be implemented for the purpose of helping the system meet operational restrictions or noise or emissions. By simply engaging the electric motor to drive the ac compressor, using available battery power, the level of noise or emissions normally generated would be reduced (from that generated by internal combustion engine or other auxiliary power generator commonly employed by commercial long haul trucks.

Exemplary Component Descriptions

The descriptions below are provided to illustrate the types or specifications for various components suitable for incorporation into one or preferred embodiments of the system (operation of these exemplary systems). The component descriptions are provided for illustration only, and shall not be construed as limiting the disclosure and its concepts.

Internal combustion engine: Prime mover for the generator an or the HVAC compressor, may be a KUBOTA Engine or similar.

Motor/generator: provide power to start Internal combustion engine and/or the compressor or other equipment. This unit may also act as a generator when overcome by the engine, may be an ECycle brushless motor.

Inverter/charger: This unit converts DC power to AC and preferably incorporates power islanding features, charging capabilities, power monitoring capabilities and automatic transfer switch. Suitable models include the XANTREX or Schneider model 60048 On Grid and Off Grid Inverter.

Battery bank: May be AGM, Deep Cell or another battery capable of producing as much as 100 ah or more at 48 volts or 200 a or more at 24 volts or 400 amp hours or more at 12 volts. Most battery types available in the market are suitable, including those suitable for golf cart or marine applications.

DC Regulator: capable of regulating the output voltage of the DC motor to 48, 24 or 12 volts, may be manufactured by America Power Systems Inc.

Engine clutch: magnetic clutch similar to those used in vehicular HVAC compressor systems.

Compressor clutch: magnetic clutch similar to those used in vehicular HVAC compressor systems.

ECU: capable of multiple analog and digital Inputs and Outputs similar to those found on DC generators such as the Deep Sea 4700 series controller.

Exemplary Power Generator Operations

Figure 3:
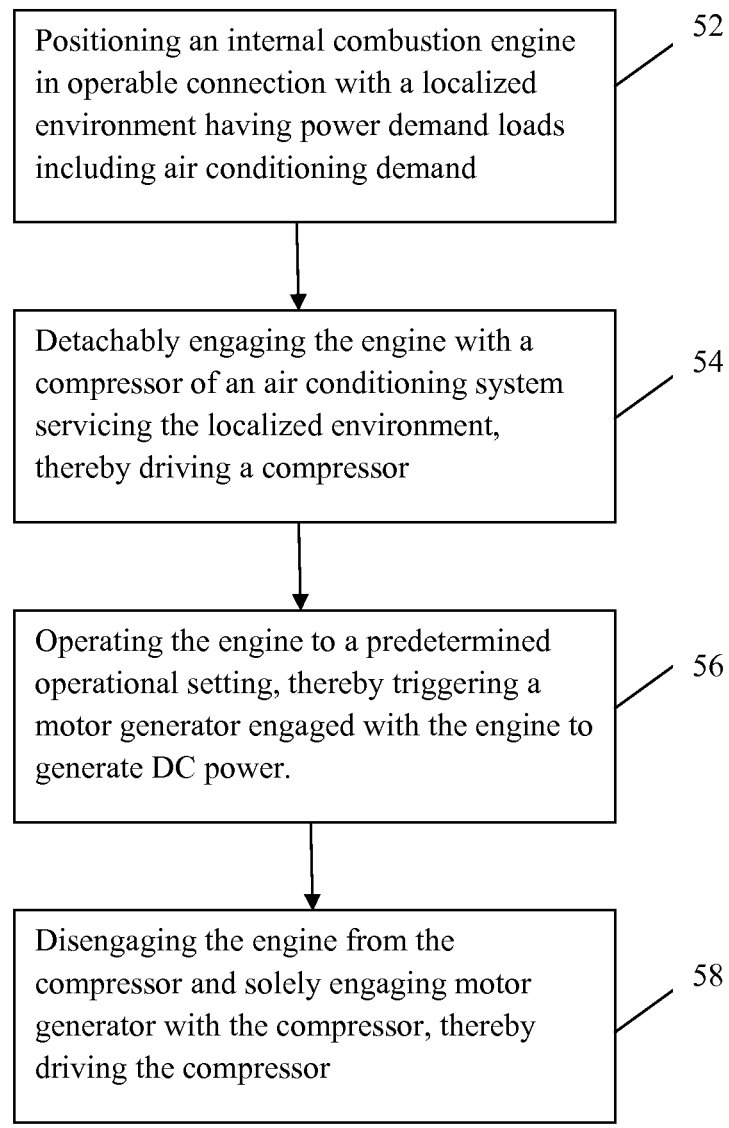
FIG. 3 is a simplified flow chart of a process for generating power for localized consumption.

The flow chart of FIG. 3 illustrates steps associated with at least one exemplary method of power generation and/or distribution according to the disclosure. The method is applicable to and associated with a localized environment having demand loads, such as a stationary environment in the form of a residence or commercial office building, or a truck having a main propulsion engine and an APU. The process represented by the flow chart is provided for illustration and to highlight various important capabilities of a preferred system and method.

A preferred method entails providing such a localized environment having a demand load such as an air conditioning unit. The air conditioning unit includes an AC compressors, as described above. An internal combustion engine is situated in or about the localized environment (52) and preferably, selectively and/or detachably engageable with the AC compressor to drive the compressor, thereby transferring mechanical energy to the compressor (54). This also transfers energy to the refrigeration cycle operable by or through the air conditioning system, and more specifically, the working fluid of the cycle. In this exemplary method, a DC motor generator is operated to initiate or start the engine. The engine is further driven to a predetermined setting (i.e., set RPM), at which point the motor generator begins to generate DC power (e.g., the motor is overcome by the engine (56)). In further embodiments, the DC power generated may be communicated forward and utilized within the localized environment (e.g., provide a DC power supply to household equipment). In further applications, the DC power may be used to charge a battery bank and alternatively, the battery pack may supply DC power to the motor generator for driving the AC compressor or for initiating start-up of the internal combustion engine. In a further exemplary step, the internal combustion engine may be disengaged from the AC compressor and the motor generator engaged to drive the AC compressor, instead 58. In this mode, the motor generator is driven by DC power supplied by the battery bank.

In one respect, the present disclosure teaches generating power for a localized environment, or more specifically, converting and transferring energy for ultimate consumption by or in the localized environment. In this way, energy is transferred to meet a load (energy) demand of the localized environment. In certain of the embodiments discussed above, chemical energy in the fuel supply is converted to mechanical or rotational energy (in the internal combustion engine). In specific examples, mechanical energy in the engine is used to rotationally drive the compressor, which in turn compresses the working fluid, thereby transferring the mechanical energy to the working fluid and for use in the refrigeration cycle.

Figure 4:
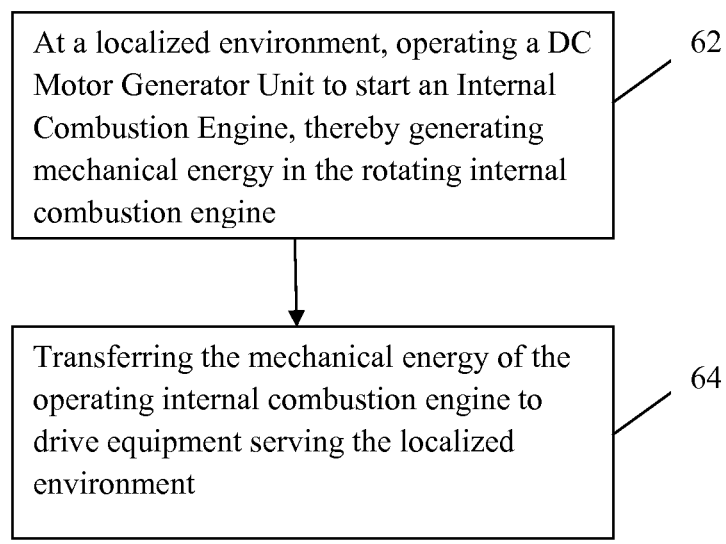
FIG. 4 is a simplified flow chart of yet another alternative process or method for generating power for a localized environment.

Referring to FIG. 4, a basic process embodied by various applications further involves the utilization of stored energy in the battery bank to turn the motor generator unit (62). Functioning as a starter, the motor generator cranks the internal combustion engine, thereby facilitating its start-up and generating mechanical or rotating energy therein. This mechanical energy is then applied to drive a compressor or other equipment serving the localized environment 64, effectively transferring the generated energy to meet demand load of the localized environment.

Figure 5C:
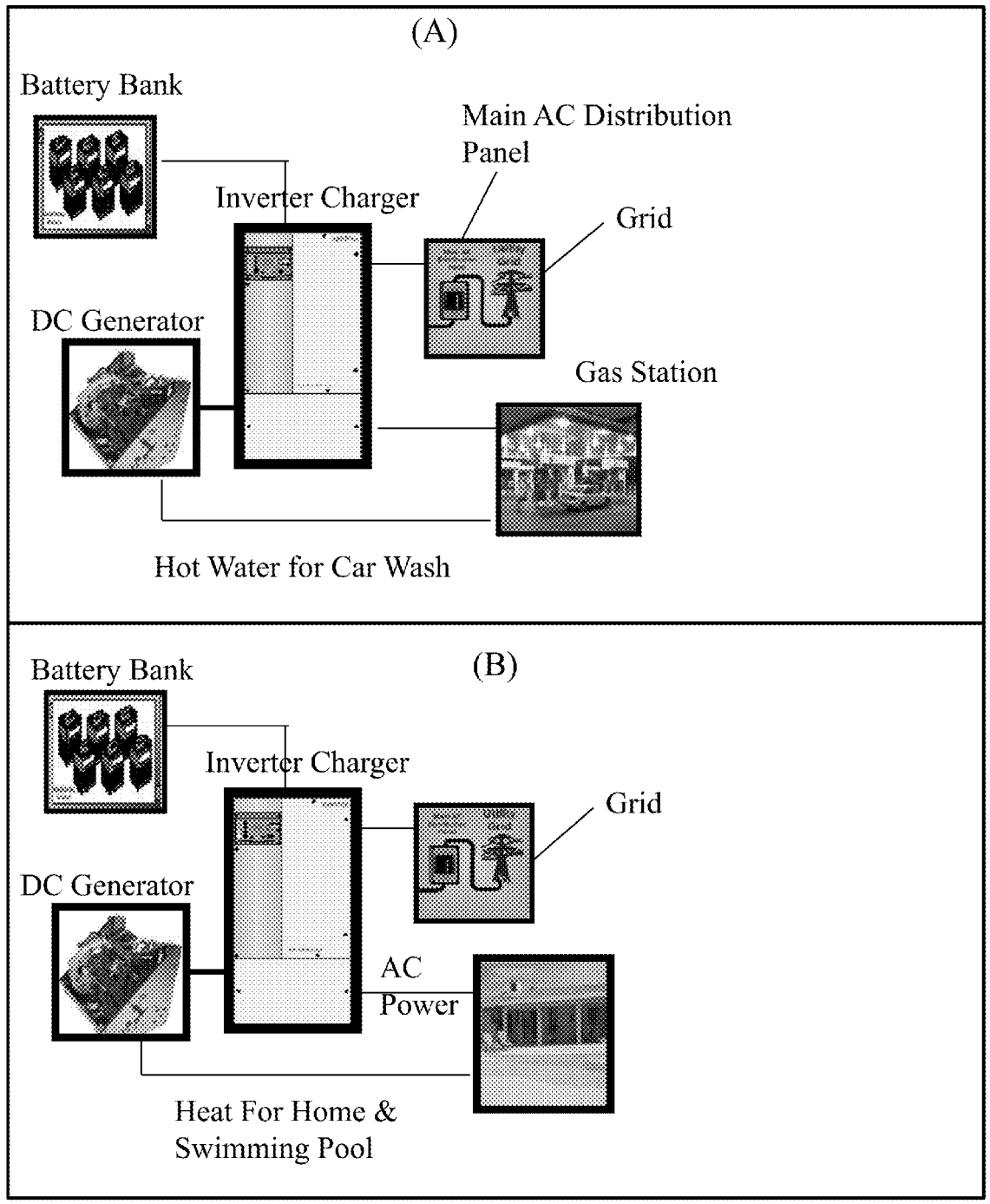
Figure 5D:
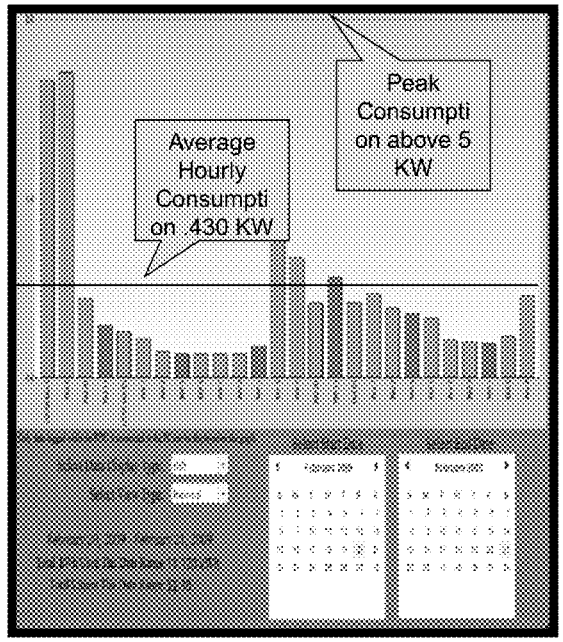
Figure 5E:
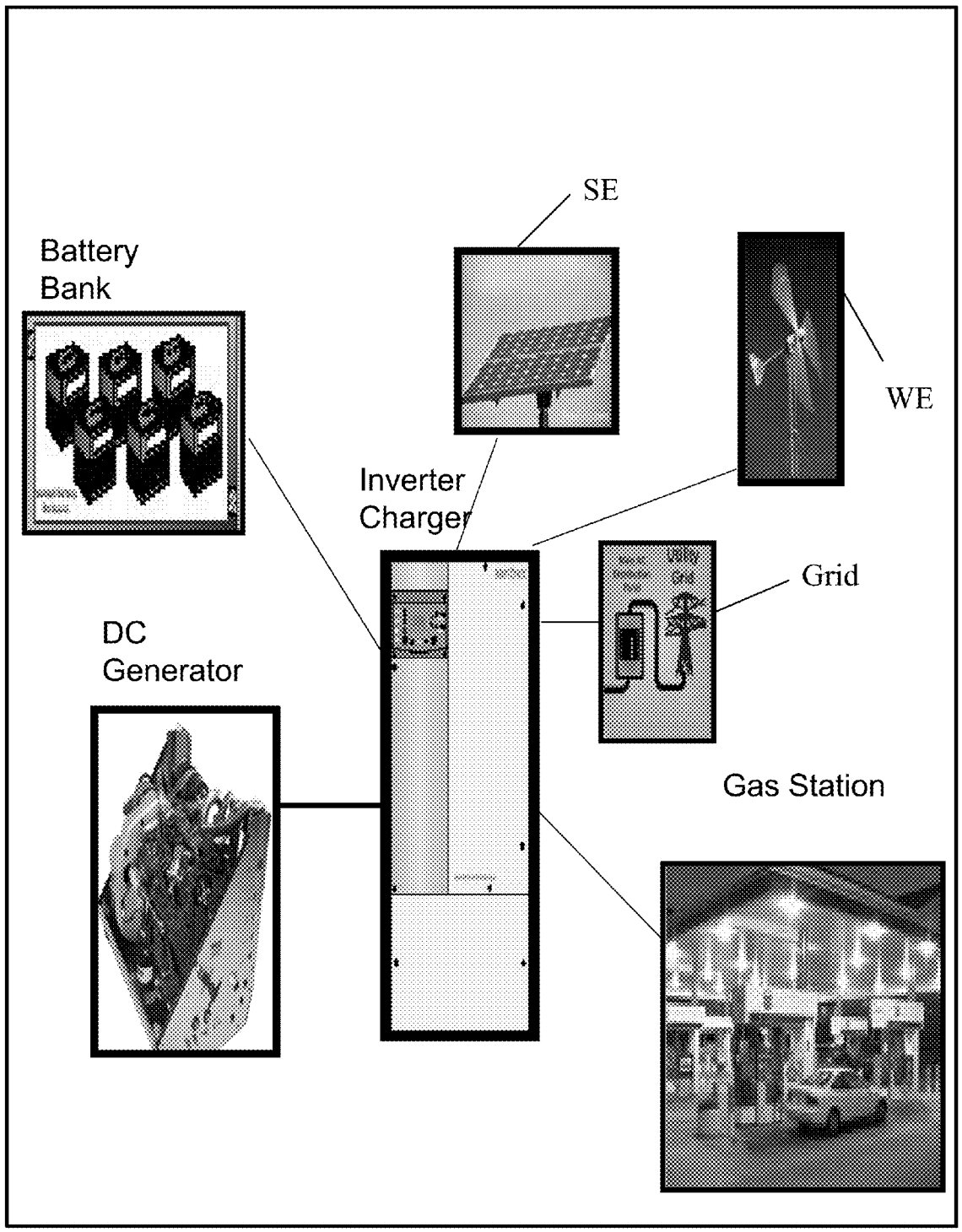

FIG. 5 are excerpts from a proposed marketing power point presentation, which provides yet further example of a preferred embodiment of the disclosed systems and methods. The presentation describes benefits associated with implementation of the systems and methods, as well as components and equipment that are likely to be well suited for incorporation with these systems and methods. Referring to FIG. 5A, an exemplary system is provided having over 3 tons of cooling capacity and 50,000 BTUs of heat, at 75 to 80% efficiency rating. Components of the exemplary system are depicted in FIG. 5, including an inverter system for providing clean and reliable A/C power and a battery bank for back up power. A suitable inverter commercially available from Xantrex (Elkhart, Ind.) is detailed in FIG. 5B. In preferred designs, the system architecture allows for interconnection with or to renewable power sources (see e.g., FIG. 5E).

FIG. 5C illustrate two potential applications of the system and method described above. The first application entails installation at a (localized) gas station and utilizing system heat for providing hot water at a car wash. The second application illustrates system incorporation at (localized) residence. The system provides power for normal loads while also providing heat used by the residential space and/or a heating water for the swimming pool.

The chart and diagram of FIG. 5D illustrates use of the system to trim energy demand peaks (e.g., by a local residence). The exemplary system may, for example, provide space heating and water heating, while generating electricity for local use. The system may further address and trim peaks by meeting air conditioning demands while eliminating or reducing compressor electric motor start peaks. Additional electric peaks may also be managed or accommodated by the battery bank.

Finally, FIG. 5E illustrates the system's integration with renewable energy sources—solar and wind (SE, WE). The exemplary system provides power to a local gas station while communicating also with the renewable energy sources.

Figure 6:
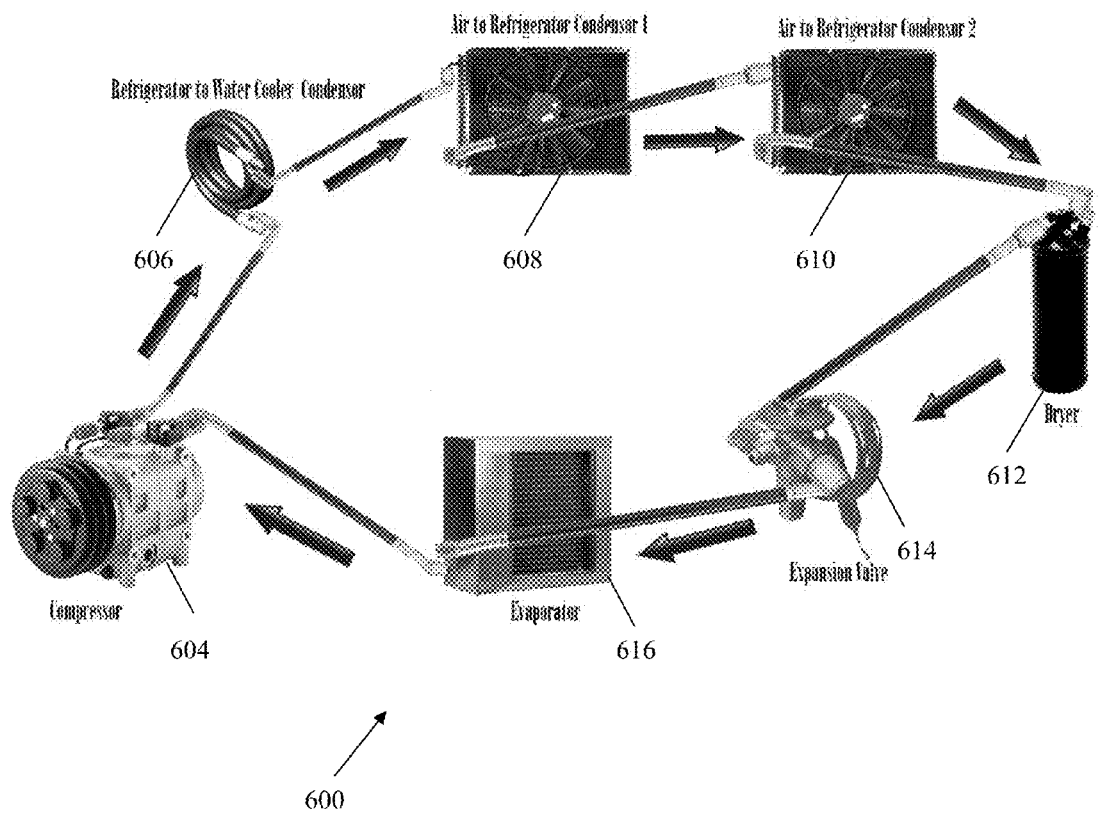
FIG. 6 is a simplified diagram of an alternative refrigeration circuit amenable to incorporation into a system and method of the present disclosure.

FIG. 6 is a simplified illustration of a refrigeration circuit 600 for incorporation with the systems (and methods) described above. The refrigeration circuit 600 (and the refrigeration cycle in which it operates) features a water cooler condenser 606 communicable with a compressor 604 and positioned downstream thereof to receive pressurized vapor from the compressor 604. In the exemplary system depicted, the water cooler condenser 606 discharges into a serial pair of air to refrigerator condensers 608,610. The second condenser 610 then discharges cooler working fluid into a dryer 612 before directing the drier working fluid into an expansion valve 614. The cooled working fluid is then directed to an evaporator 616, where it absorbs heat from the environment before returning the working fluid to the low pressure side of the compressor 604. In the embodiment, the water cooler condenser 606 allows recuperation of as much heat as displaced by the air conditioner and incorporation of the heat to for air drying using a dessicant dehumidifier.

The foregoing description has been presented for purposes of illustration and description of preferred embodiments. This description is not intended to limit associated concepts to the various systems, apparatus, structures, and methods specifically described herein. For example, system and methods described in the context of a residence, may be applicable, in part or in entirety, to other permanent or stationary installations, such as commercial office building, factory, warehouse or other workplace, or such non-permanent but defined localized environments, as long-haul trucks or similar powered mobile vehicles. The embodiments described and illustrated herein are further intended to explain the best and preferred modes for practicing the system and methods, and to enable others skilled in the art to utilize same and other embodiments and with various modifications required by the particular applications or uses of the present invention.

What is claimed is:

1. A system for generating electric power in a localized installation, said system comprising:
 a hybrid power generator;
 an air conditioning cooling system, including a compressor; and
 a selectively engageable drive assembly operably connected with the power generator, whereby the power generator is enageable with the compressor to compress a working refrigerant fluid; and
 wherein the hybrid power generator includes an internal combustion engine and an electric motor, the drive assembly being operable to selectively engage the electric motor and the internal combustion engine with the compressor.

2. The system of claim 1, wherein the electric motor is a DC motor generator unit operable to generate DC power.

3. The system of claim 2, further comprising an inverter charger operably connected with output of the DC motor generator unit, for converting DC power to AC power.

4. The system of claim 3, further comprising a battery bank operably connected with the motor generator unit to supply power thereto.

5. The system of claim 1, further comprising a heat exchanger including a circulation loop for passing a working fluid in heat transfer relation with a hot circulation drawing heat from the engine.

* * * * *